(12) United States Patent
Higuchi et al.

(10) Patent No.: US 8,328,051 B2
(45) Date of Patent: Dec. 11, 2012

(54) FINE POWDER FILLER SYSTEM

(75) Inventors: Fumii Higuchi, Mississauga (CA); Wayne Louie, Toronto (CA)

(73) Assignee: Xerox Corporation, Norwalk, CT (US)

( * ) Notice: Subject to any disclaimer, the term of this patent is extended or adjusted under 35 U.S.C. 154(b) by 472 days.

(21) Appl. No.: 12/490,410

(22) Filed: Jun. 24, 2009

(65) Prior Publication Data

US 2010/0327020 A1 Dec. 30, 2010

(51) Int. Cl.
*G01F 11/20* (2006.01)
(52) U.S. Cl. ........ 222/241; 222/227; 222/413; 366/196; 366/293; 366/330.1
(58) Field of Classification Search .................. 222/227, 222/236–248, 413–414, 228; 141/2; 366/194–196, 366/292–293, 295, 312–313, 326.1, 330.1–330.7
See application file for complete search history.

(56) References Cited

U.S. PATENT DOCUMENTS

| | | | | | |
|---|---|---|---|---|---|
| 2,531,305 | A | * | 11/1950 | Smith | 222/241 |
| 3,148,802 | A | * | 9/1964 | Webb | 222/643 |
| 3,251,512 | A | * | 5/1966 | Irving | 222/232 |
| 3,948,421 | A | * | 4/1976 | Marchadour | 222/240 |
| 4,144,805 | A | * | 3/1979 | Cacho | 99/568 |
| 4,669,966 | A | * | 6/1987 | v. Deuren | 425/209 |
| 5,339,998 | A | * | 8/1994 | Warren | 222/241 |
| 5,527,108 | A | * | 6/1996 | Miller | 366/157.3 |
| 6,000,446 | A | * | 12/1999 | Wegman et al. | 141/131 |
| 6,196,278 | B1 | * | 3/2001 | Wegman et al. | 141/65 |
| 6,347,648 | B1 | * | 2/2002 | Wegman et al. | 141/1 |
| 6,353,723 | B1 | | 3/2002 | Hays et al. | |
| 6,810,921 | B2 | * | 11/2004 | Schlosser | 141/2 |
| 6,951,230 | B1 | | 10/2005 | Wegman | |
| 7,004,210 | B1 | | 2/2006 | Wegman et al. | |
| 7,302,975 | B2 | * | 12/2007 | Wegman | 141/80 |
| 7,320,561 | B2 | | 1/2008 | Ambs | |

* cited by examiner

*Primary Examiner* — Kevin P Shaver
*Assistant Examiner* — Andrew P Bainbridge
(74) *Attorney, Agent, or Firm* — Gibb & Riley, LLC

(57) ABSTRACT

Disclosed are embodiments of a powder filler system incorporating a pair of symmetrical agitators within a hopper, containing powder and having an upper cylindrical portion and a lower funnel portion. Each agitator includes: a first bar extending from the top of the hopper to a tubular section of the funnel portion; a second bar connected to the first bar and extending towards an interface between the upper cylindrical and lower funnel portions of the hopper; a third bar connected to both the first and second bars such that it is approximately parallel to an angled sidewall of a conical section of the funnel portion; and vertically oriented and angled fins connected between the second and third bars. Agitators configured in this manner maintain the powder at an essentially uniform density within the hopper; move the powder towards the auger such that cavitations/starvations are avoided; and ensure a steady discharge flow.

21 Claims, 3 Drawing Sheets

FINE POWDER FILLER SYSTEM

BACKGROUND

Embodiments herein generally relate to electrostatographic printers and copiers or reproduction machines. More particularly, the embodiments relate to a fine powder filler system for conveying a powder, such as Xerographic toner powder, into a container, such as a toner cartridge.

Conventional powder filler systems, such as those used to fill cartridges with toner powder for printers, copiers, etc., typically incorporate a fill hopper having a cylindrical-shaped upper portion and a funnel-shaped lower portion. Powder poured into the upper portion of the fill hopper is directed out an outlet at the bottom of the lower portion of the fill hopper and into another container (e.g., a cartridge) by a rotating auger that extends through the center of the fill hopper. Exemplary powder filler systems are disclosed in the following U.S. Patents, assigned to Xerox Corporation of Norwalk, Conn., USA, and incorporated herein by reference: U.S. Pat. No. 6,951,230 of Wegman issued on Oct. 4, 2005 and U.S. Pat. No. 7,004,210 of Wegman et al. issued on Feb. 28, 2006. While the above-mentioned patents disclose powder filler systems suitable for the purpose for which they were offered, there is a need in the art for improved powder filler systems that allow for greater productivity and cost savings.

SUMMARY

In view of the foregoing, disclosed are embodiments of a fine powder filler system. The embodiments incorporate a pair of essentially symmetrical agitators within a hopper on opposite sides of an auger. Each agitator includes at least three bars and a plurality of parallel, angled, fins. Specifically, a first bar extends from the top of the hopper immediately adjacent to the auger down to a tubular section of a funnel portion of the hopper. A second bar is connected to the first bar and extends away from the auger towards an interface between the funnel portion of the hopper and a cylindrical portion of the hopper. A third bar is connected to both the first and second bars such that it is adjacent and approximately parallel to an angled sidewall of a conical section of the funnel portion of the hopper. The fins can be vertically oriented, angled towards the center of the hopper and connected between the second and third bars. Agitators configured in this manner pre-condition the powder; maintain the powder at an essentially uniform density within the hopper; move the powder towards the auger such that cavitations/starvations are avoided during continuous high-speed filling; and further ensure that the powder is discharged by the auger from the hopper in a steady flow.

More particularly, disclosed herein are embodiments a fine powder filler system for conveying a powder, such as Xerographic toner powder, into a container, such as a toner cartridge. The system embodiments comprise a hopper, an auger and a pair of agitators.

The hopper can contain powder. Additionally, the hopper can have an upper portion and a lower portion below the upper portion. The upper portion can comprise a cylinder and the lower portion can comprise a funnel. The funnel can comprise a conical section connected to the upper portion and a tubular section connected to an opening at the apex of the conical section. The tubular section can have an outlet for the powder.

The auger can extend vertically through a center of the hopper to the outlet at the bottom of the funnel. The auger can be connected to a first motor that rotates the auger at a first rotation speed.

The pair of agitators can be positioned adjacent to opposite sides of the auger. The agitators can be connected to a second motor that rotates them simultaneously about the auger at a second rotation speed. Each agitator can comprise at least three bars. Specifically, a first bar can extend vertically from a top of the hopper adjacent to the auger to approximately the apex of the conical section of the hopper. A second bar can be connected to the first bar and can extend horizontally away from the auger at approximately the interface between the upper and lower portions of the hopper. A third bar can be connected to both the first and second bars such that it is positioned adjacent to and approximately parallel to an angled sidewall of the conical section of the funnel. Optionally, a fourth bar can be connected to the second bar above the third bar and can extend vertically toward the top of the hopper adjacent to a vertical sidewall of the upper portion of the hopper. Each agitator can further comprise a plurality of parallel fins oriented vertically and connected between the second and third bars. Each fin can have a first edge and a second edge opposite the first edge. The first edge can be relatively thin as compared to the second edge and the first edge can comprise the leading edge during rotation of the pair of agitators. Additionally, each fin can be positioned at a predetermined angle with respect to a plane extending across the diameter of the hopper such that, during rotation of the agitators, the fins will direct the powder towards the auger at the center of the hopper. The predetermined angle at which the fins can be set can, for example, range between approximately 45 to approximately 85 degrees. In one embodiment, the fins are fixed to the second and third bars such that predetermined angle remains constant. In another embodiment, the fins can be connected to the second and third bars such that the predetermined angle can be selectively adjusted, as a function of the desired rate of discharge of the powder at the outlet, the flow characteristics of the powder, etc.

As mentioned above, the first motor rotates the auger at a first rotation speed and the second motor rotates the pair of agitators at a second rotation speed. The first and second rotation speeds can each be predetermined so that the powder is maintained at a known and essentially uniform density within the hopper without the formation of cavitations/starvations near the auger, so that the powder is moved towards the auger and further so that the powder is discharged from the outlet at a known and essentially uniform rate. Thus, the amount of discharged powder can be determined, based on time, without the use of a weight scale. In one exemplary embodiment, the first predetermined rotation speed of the auger can be between approximately 500 and 2000 rotations per minute and the second predetermined speed of the pair of agitators can be between approximately 15 and 20 rotations per minute.

Finally, to ensure that the agitators do not bend, swing, etc. during rotation through the powder, a support ring can be connected to and can support each of the agitators and, more particularly, the first bar of each of the agitators. In the event that such a support ring is used, the auger can extend through and rotate within this support ring.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
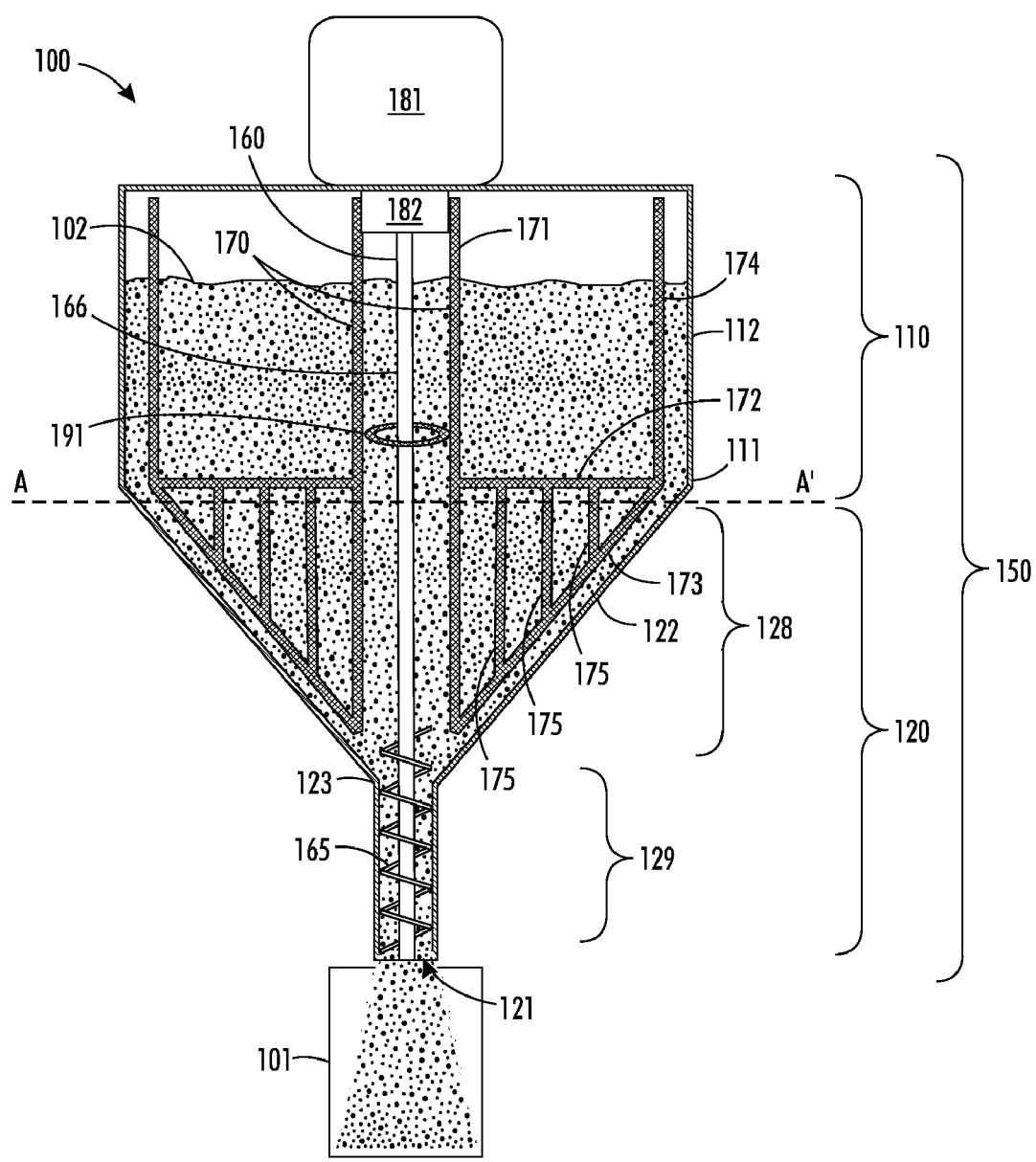
FIG. 1 is a schematic diagram of an embodiment of a fine powder filler system including a pair of agitators.

The embodiments herein are useful in conjunction with printing/copying devices that use toner cartridges because they relate to a fine powder filler system that conveys a powder, such as Xerographic toner powder, into a container, such as a toner cartridge.

As mentioned above and referring to FIG. 4, conventional powder filler systems 400, such as those used to fill cartridges 401 with toner powder 402 for printers, copiers, etc., typically incorporate a fill hopper 450 having a cylindrical-shaped upper portion 410 and a funnel-shaped lower portion 420. Powder 402 poured into the upper portion 410 of the fill hopper 450 is directed out an outlet 421 at the bottom of the hopper 450 and into another container 401 (e.g., a cartridge) by a rotating an auger 460 that extends through the center of the hopper 450. Ideally, the rotation rate of the auger 460 dictates the rate at which the powder 402 is discharged from the hopper 450 into the cartridge 401 (i.e., the powder discharge rate). However, one problem that can occur with such conventional powder filling systems, particularly in the case of fine powder particulates, is the formation of cavitations 490 within the powder 402 (i.e., air gaps, starvations, spaces, etc. within the powder 402), due to a relatively high discharge rate and relatively poor powder flow characteristics.

Specifically, if powder 402 within a fill hopper 450 can not be maintained at a uniform density (i.e., if cavitations/starvations 490 form), then the actual rate at which the powder 402 is discharged at the outlet 421 will vary, even if the rotation speed of the auger 460 is constant. Thus, a weight scale is required to monitor, by weight, the amount of powder discharged from the hopper 450 into each cartridge 401.

Figure 4:
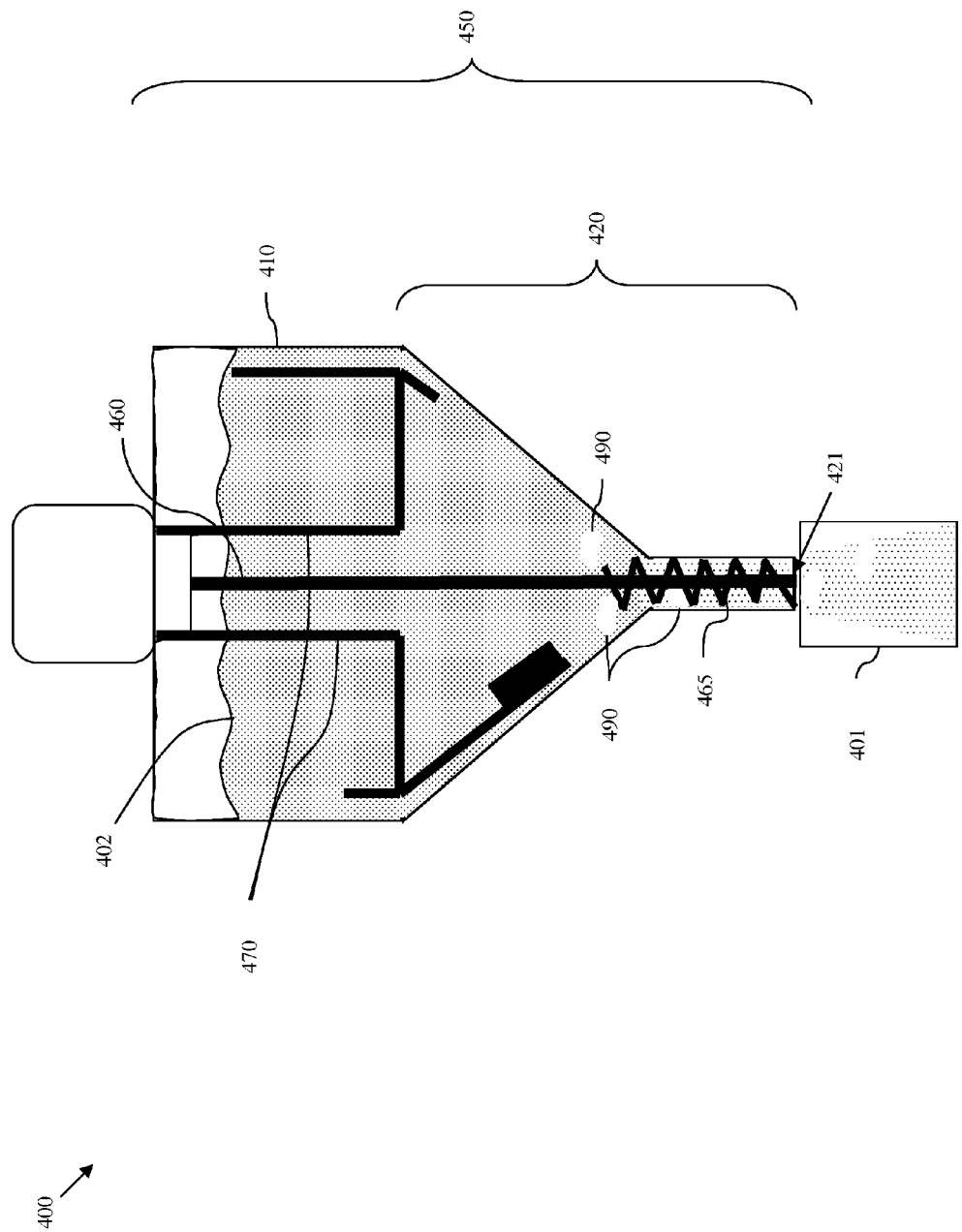
FIG. 4 is a schematic diagram of a prior art fine powder filler system, including a pair of agitators.

Powder agitators (i.e., powder mixers), such as the pair of asymmetrical agitators 470 illustrated in FIG. 4, can be incorporated into powder filling systems. Specifically, such agitators 470 can be designed to rotate about the auger 460 within the hopper 450 in order to pre-condition the powder and also to move the powder 401 towards the spiral-shaped lower portion 465 of the auger 460 for discharge. U.S. Pat. No. 7,302,975 of Wegman issued on Dec. 4, 2007, assigned to Xerox Corporation of Norwalk, Conn., USA, and incorporated herein by reference, also discloses a powder filler system that incorporates rotating agitators that pre-condition powder within a fill hopper and move the powder towards the spiral-shaped lower portion of an auger for discharge. For large powder particulates (i.e., powder particulates greater than 10 µm), these agitators maintain essentially uniform powder density and achieve good flow characteristics, thereby avoiding the formation of cavitations and allowing for a consistent discharge rate. However, such agitators do not perform as well for the latest design of color toner powders, which have smaller particulate sizes (e.g., powder particulates of less than 10 µm and, more particularly, equal to or less than approximately 5 µm), which have surface chemicals that help with functionality and which have surface waxes that make the powder much more difficult to handle.

In view of the foregoing, disclosed are embodiments of a fine powder filler system. The embodiments incorporate a pair of essentially symmetrical agitators within a fill hopper on opposite sides of an auger. Each agitator includes at least three bars and a plurality of parallel, angled, fins. Specifically, a first bar extends from the top of the fill hopper immediately adjacent to the auger down to a tubular section of a funnel portion of the fill hopper. A second bar is connected to the first bar and extends away from the auger towards an interface between the funnel portion of the fill hopper and a cylindrical portion of the fill hopper. A third bar is connected to both the first and second bars such that it is adjacent and approximately parallel to an angled sidewall of a conical section of the funnel portion of the fill hopper. The fins can be vertically oriented, angled towards the center of the fill hopper, and connected between the second and third bars. Agitators configured in this manner pre-condition the powder; maintain the powder at an essentially uniform density within the hopper; move the powder towards the auger such that cavitations/starvations are avoided during continuous high-speed filling; and ensure that the powder is discharged by the auger from the hopper in a steady flow.

More particularly, referring to FIG. 1, disclosed herein are embodiments a fine powder filler system 100 for conveying a powder 102, such as Xerographic toner powder, into a container 101, such as a toner cartridge. The system 100 embodiments comprise a fill hopper 150, an auger 160 and a pair of agitators 170 (i.e., mixers).

The fill hopper 150 can contain (i.e., can be adapted to contain) powder 102. The powder 102 can comprise, for example, toner powder for printers, copiers, etc. The powder 102 can further comprise a fine powder having a relatively small particulate size (e.g., a particulate size of less than 10 µm and, more particularly, equal to or less than approximately 5 µm), having surface chemicals for functionality and/or having surface waxes. The powder 102 can be received through the top of the fill hopper 150 from a supply hopper (not shown).

Additionally, the fill hopper 150 can have an upper portion 110 and a lower portion 120 below and connected to the upper portion 110. The upper portion 110 can comprise a cylinder (i.e., can be cylindrical in shape) and the lower portion 120 can comprise a funnel (i.e., can be funnel-shaped). The funnel 120 (i.e., the lower portion of the fill hopper 150) can comprise a conical section 128 (i.e., an essentially cone-shaped section) connected to the upper portion 110 and a tubular section 129 (i.e., an essentially tube-shaped section) connected to an opening at an apex 123 of the conical section 128. The tubular section 129 can have an outlet 121 for discharging the powder 102 into the container 101. The fill hopper 150 can be formed, for example, from stainless steel or any other suitable material and can further be formed as a single component molded together or as multiple components welded or otherwise connected together.

In one exemplary embodiment the fill hopper 150 can comprise a relatively large fill hopper 150 having the following dimensions. The height of the fill hopper 150 can range between 30¾ inches and 33½ inches and, more particularly, between 31½ inches and 33 inches. The diameter of the upper portion 110 of the fill hopper 150 can range between 20 inches and 22¼ inches and, more particularly, between 20½ and 21¾ inches. The height of the upper portion 110 of the hopper 150 can range between 15 inches and 17 inches and, more particularly, between 15½ inches and 16½ inches. The height of the lower portion 120 of the hopper 150 can range between 14¾ inches and 17½ inches and, more particularly between 15¼ inches and 17 inches. The diameter of the tubular section 129 of the lower portion 120 can range between 1½ inches and 5½ inches and, more particularly, between 2 inches and 4 inches. The above-listed fill hopper 150 dimensions are exemplary only and may vary as a function of the size of the container 101 being filled, the sizes of the opening of the container 101 into which the powder 102 is discharged, the amount of powder 102 being discharged into the container 101, the number of containers 101 being filled from the hopper 150, the flow characteristics of the powder 102, etc.

The auger 160 can extend vertically through the center of the fill hopper 150 to the outlet 121 at the bottom of the funnel 129. More specifically, the auger 160 can comprise a drive shaft section 166 extending from the top of the hopper 150 to approximately the apex 123 of the conical portion 128 of the funnel 120 and a helical section 165 (i.e., a section having the form of a helix spiral) connected to the drive shaft section 166 and extending through the tubular portion 129 of the funnel 120 to the outlet 121. The auger 160 can be connected to a first motor 181 at the top of the fill hopper 150 that rotates the auger 160 at a first rotation speed (e.g., a first number of rotations per minute) such that the powder 102 from the hopper 150 is conveyed through the outlet 121. As with the hopper 150, the auger 160 can be formed, for example, from stainless steel or any other suitable material and can further be formed as a single component molded together or as multiple components welded or otherwise connected together.

The pair of agitators 170 can be positioned adjacent to opposite sides of the auger 160 and, more particularly, opposite sides of the drive shaft 166 of the auger 160. The agitators 170 can be connected to a second motor 182 that rotates them simultaneously about the auger 160 at a second rotation speed (e.g., a second number of rotations per minute) so as to pre-condition (i.e., mix) the powder 102 and move it towards the auger 160, as discussed in greater detail below. The second rotation speed of the agitators 170 is typically slower than the first rotation speed of the auger 160.

Each agitator 170 can comprise at least three bars. Specifically, in each agitator 170, a first bar 171 can extend vertically from a top of the fill hopper 150 adjacent to the auger 160 to approximately the apex 123 of the conical section 128 of the funnel 120. During rotation of the agitators 170, this first bar 171 which extends the length of the auger 160 drive shaft 166 functions to maintain the powder 102 in a dense state around the auger drive shaft 166, where the powder 102 tends to get fluidized more easily due to the high rotation speed of the auger 160. A second bar 172 can be connected to the first bar 171 and can extend horizontally away from the auger 160 (i.e., away from the center of the hopper 150) at approximately the interface 111 between the upper and lower portions 110, 120 of the hopper 150 (i.e., at the interface between the cylinder and the funnel). That is, the second bar 172 can be perpendicular to the first bar 171 and can be positioned at a level that is approximately parallel to the interface 111. A third bar 173 can be connected to both the first and second bars 171, 172 such that it is positioned adjacent to and approximately parallel to an angled sidewall 122 of the conical section 128 of the funnel 120. That is, the third bar 173 is connected to the first bar 171 adjacent to the apex 123 of the conical section 128 of the funnel 120 and further connected to the distal end of the second bar 172 adjacent to the interface 111. Optionally, a fourth bar 174 can be connected to the distal end of the second bar 172 above the third bar 173 and can extend vertically toward the top of the hopper 150 adjacent to the vertical sidewall 112 of the upper portion 110 of the hopper 150. The bars 171-174 can be rectangular shape or can comprise any other suitable shape (e.g., circular, oval, fin-shaped, etc.).

Figure 2:
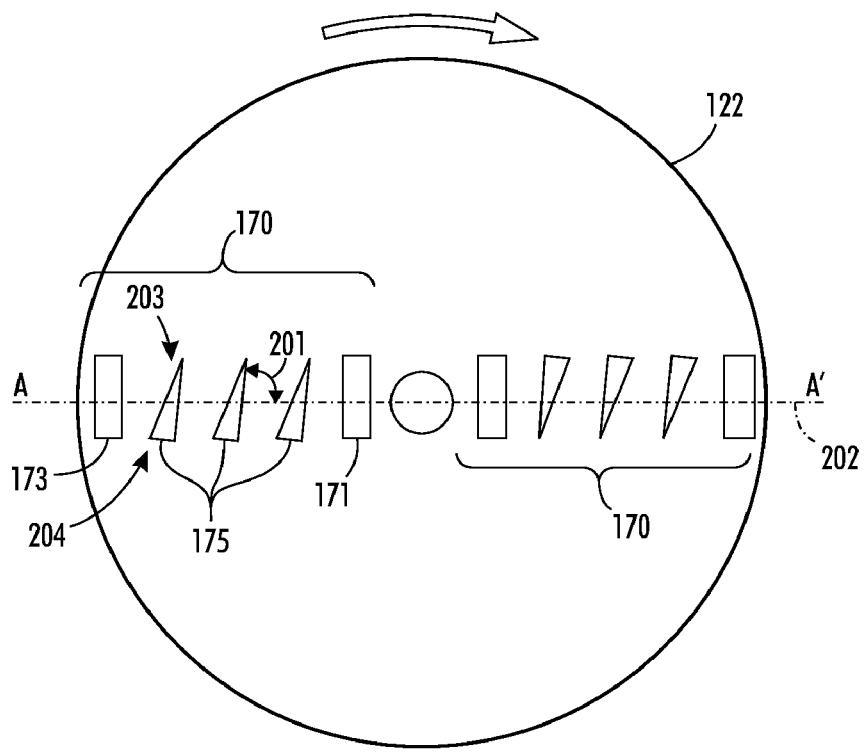
FIG. 2 is an illustration of the cross section A-A' through the pair of agitators as shown in FIG. 1.
Figure 3:
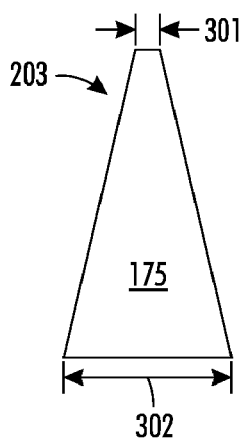
FIG. 3 is an illustration of a single fin from an agitator as shown in FIG. 2.

Referring to FIGS. 2 and 3 in combination with FIG. 1, each agitator 170 can further comprise a plurality of parallel fins 175 (i.e., fin-shaped bars, blades, ribs, baffles, etc.) oriented vertically and connected between the second and third bars 172, 173. The fins 175 can be evenly spaced (i.e., the distance between each fin 175 and between a fin 175 and bar 171 or 173 can be approximately equal). Additionally, each of the fins 175 of each of the agitators 170 can have a first edge 203 and a second edge 204 opposite the first edge 203. The first edge 203 can be relatively thin as compared to the second edge 204 and the first edge 203 can comprise the leading edge during rotation of the pair of agitators 170. In one exemplary embodiment, the fins 175 can have the following dimensions. The first edge 203 can have a thickness 301 ranging between $1/8^{th}$ of an inch and $1/4$ of an inch and the second edge 204 can have a thickness 302 ranging between $3/4$ of an inch and 2 inches. The above-listed fin dimensions are exemplary only and may vary as a function of the size of the hopper 150, the flow characteristics of the powder 102, etc.

Furthermore, in each agitator 170, the fins 175 can be positioned at a predetermined angle 201 with respect to a plane 202 extending across the diameter of the hopper 150 such that, during rotation of the agitators 170, the fins 175, not only pre-condition the powder 102, but direct (i.e., push, pump, etc.) the powder 102 towards the auger 160 and, more particularly, towards the helical portion 165 of the auger 160. Movement of the powder 160 in this manner ensures an essentially uniform powder density within the hopper 150 and minimizes or avoids altogether the formation of cavitations/starvations within the powder 102 near the auger 160 and, specifically, within the powder 102 at the apex 123 of the conical section 128 of the funnel 120. The predetermined angle 201 at which the fins 175 can be set can range between approximately 45 to approximately 85 degrees and, more particularly, between approximately 60 to approximately 70 degrees with respect to the plane 202.

In one embodiment, the fins 175 can be fixed to the second and third bars 172, 173 such that predetermined angle 201 remains constant (i.e., can not be adjusted). In another embodiment, the fins 175 can be pivotably connected to the second and third bars 171, 172 (e.g., by vertically aligned hinges or pivot shafts with at least two different settings) such that the predetermined angle 201 can be selectively adjusted as a function of the desired rate of discharge of the powder 102 at the outlet 121, the flow characteristics of the powder 102, etc. The agitators 170 can each be formed, for example, from stainless steel or any other suitable material and further formed as a single component molded together or as multiple components welded or otherwise connected together.

As mentioned above, the first motor 181 rotates the auger 160 at a first rotation speed and the second motor 182 rotates the pair of agitators 170 at a second rotation speed. The first and second rotations speeds can each be predetermined so that the powder 102 within the hopper 150 can be maintained at a known and essentially uniform density and further so that the powder 102 can be discharged from the outlet 121 of the funnel 120 at a known and essentially uniform rate. That is, because the powder 102 within the hopper 150 can be maintained (as a function of the rotation speed of the agitators 170, which are specifically configured as described in detail above) at a known and essentially uniform density without the formation of cavitations/starvations near the auger 160 during continuous high-speed filling, a continuous supply of powder 1021 is presented to the apex 123 and the discharge rate of the powder 102 can be selectively controlled (as a function of the uniform density of the powder and the rotation speed of the auger 160), thereby ensuring a steady discharge flow. Thus, a determination can be made as to the amount of powder 102 discharged from the outlet 121 based on time (i.e., the amount of time during which the powder was discharged) without requiring a weight scale. In one exemplary embodiment, the first predetermined speed of the auger 160 can be between approximately 500 and 2000 rotations per minute and the second predetermined speed of the pair of agitators 170 can be between approximately 15 and 20 rotations per minute.

It should be noted with the optional fourth bars 174 attached to each of the agitators 170, the system 100 simultaneously agitates the powder 102 in both the upper and lower portions 110 and 120 of the hopper 150. Therefore, the speed at which the agitators 170 are rotated can be cut in half relative to the speed at which the agitators 470 of FIG. 4 are rotated and still accomplish the same effect, when all other factors are equal (e.g., when hopper dimensions and auger speeds are the same). This is because the pair agitators 470 in the hopper 450 of FIG. 4 are asymmetrical, with only one agitating the powder 402 in the upper portion 410 of the hopper 450 and only one agitating the powder 402 in the lower portion 420. Rotating the agitators 170 at a relatively lower speed is advisable in the case of temperature sensitive powders and, particularly, in the case of powders, which have a relatively low melt temperature and which tend to fuse on the agitators, generating undesirable coarse particles. Additionally, since the system 100 can simultaneously agitate the powder 102 in both the upper and lower portions 110 and 120 of the hopper 150, the rotation speed of the auger 160 can also be increased in order to significantly increase the powder discharge rate and, thereby the fill rate for the container without requiring a corresponding increase in the rotation speed of the agitators 170.

Finally, to ensure that the agitators 170 do not bend, swing, etc. during rotation through the powder 102, a support ring 191 (as shown in FIG. 1) can be connected to and can support each of the agitators 170 and, more particularly, the first bar 171 of each of the agitators 170. In the event that such a support ring 191 is used, the drive shaft 166 of the auger 160 can extend through and rotate within this support ring 191. As with the other system components discussed above, the support ring 191 can be formed, for example, from stainless steel or any other suitable material and can further be formed as a single component molded together or as multiple components welded or otherwise connected together.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein should not be implied or imported from any above example as limitations to any particular order, number, position, size, shape, angle, color, or material.

Therefore, disclosed above embodiments of a fine powder filler system. The embodiments incorporate a pair of essentially symmetrical agitators within a hopper on opposite sides of an auger. Each agitator includes at least three bars and a plurality of parallel, angled, fins. A first bar extends from the top of the hopper immediately adjacent to the auger down to a tubular section of a funnel portion of the hopper. A second bar is connected to the first bar and extends away from the auger towards an interface between the funnel portion of the hopper and a cylindrical portion of the hopper. A third bar is connected to both the first and second bars such that it is adjacent and approximately parallel to an angled sidewall of a conical section of the funnel portion of the hopper. The fins can be vertically oriented, angled towards the center of the hopper, and connected between the second and third bars. Agitators configured in this manner pre-condition the powder; maintain the powder at an essentially uniform density within the hopper; move the powder towards the auger such that cavitations/starvations are avoided during continuous high-speed filling (even in the case of powders having relatively small particulate sizes and/or having surface chemicals and/or surface waxes that impact flow); and further ensure a steady discharge flow. Also, since the agitators are essentially symmetrical and, therefore, balanced, vibrations, during the agitation process, are minimized. This provides for a relatively steady and quiet agitation process, even in the presence of aggressive agitation and/or a relatively large quantity of powder within the fill hopper.

What is claimed is:

1. A system for conveying a powder, said system comprising:
a hopper containing said powder and having an upper portion and a lower portion below said upper portion, said lower portion comprising a funnel comprising:
a conical section connected to said upper portion; and
a tubular section connected to an apex of said conical section, said tubular section having an outlet for said powder;
an auger extending vertically through a center of said hopper to said outlet, said auger rotating such that said powder is conveyed through said outlet; and
a pair of agitators adjacent opposite sides of said auger, said pair of agitators rotating about said auger in order to mix said powder as said powder moves in a first direction toward said apex and out said outlet and each of said agitators comprising:
a first bar extending vertically from a top of said hopper adjacent to said auger to approximately said apex of said conical section;
a second bar connected to a center portion of said first bar, said second bar extending horizontally away from said auger toward an interface between said upper portion and said lower portion;
a third bar having opposing ends connected to a first end of said first bar at said apex and connected to a second end of said second bar at said interface such that said third bar is adjacent to and approximately parallel to an angled sidewall of said conical section of said funnel from said first end of said first bar at said apex to said second end of said second bar at said interface; and
a plurality of parallel fins,
each fin of said plurality of parallel fins extending vertically between and connected to both said second bar and said third bar, and
each fin of said plurality of parallel fins having a first edge comprising a leading edge and a second edge opposite said leading edge and said leading edge being relatively thin as compared to said second edge such that spaces between adjacent fins of said plurality of parallel fins become increasingly narrow from leading edges of said adjacent fins of said plurality of parallel fins to second edges of said adjacent fins of said plurality of parallel fins,
said rotating of said pair of agitators forcing said powder in a second direction through said spaces,
said forcing of said powder in said second direction through said spaces, which become increasingly narrow from said leading edges to said second edges, as said powder also moves in said first direction, which is essentially perpendicular to said second direction, ensures an essentially uniform powder density within said hopper and minimizes cavitations within said powder at said apex.

2. The system of claim 1, each of the fins of said plurality of parallel fins for each of said agitators positioned at a predetermined angle with respect to a plane extending across a diameter of said hopper such that during rotation of said pair of agitators all fins of said plurality of parallel fins direct said powder towards said auger and cavitations within said powder at said apex of said conical section are minimized.

3. The system of claim 2, said predetermined angle ranging between approximately 45-85 degrees.

4. The system of claim 1, said first edge being parallel to said second edge, said first edge having a first width ranging from 1/8-1/4 inch, said second edge having a second width ranging from 3/4-2 inches.

5. The system of claim 1, further comprising a first motor rotating said auger at a first predetermined speed and a second motor rotating said pair of agitators at a second predetermined speed so that said powder is maintained at a known and essentially uniform density within said hopper without the formation of cavitations adjacent to said auger and further so that said powder is discharged from said outlet at a known and essentially uniform rate, thereby allowing the amount of discharged powder to be determined without a weight scale.

6. The system of claim 4, said first predetermined speed comprising approximately 500-2000 rotations per minute and said second predetermined speed comprising approximately 15-20 rotations per minute.

7. A system for conveying a powder, said system comprising:
a hopper containing said powder and having an upper portion and a lower portion below said upper portion, said lower portion comprising a funnel comprising:
a conical section connected to said upper portion; and
a tubular section connected to an apex of said conical section, said tubular section having an outlet for said powder;
an auger extending vertically through a center of said hopper to said outlet, said auger rotating such that said powder is conveyed through said outlet; and
a pair of agitators adjacent opposite sides of said auger, said pair of agitators rotating about said auger in order to mix said powder as said powder moves in a first direction toward said apex and out said outlet and each of said agitators comprising:
a first bar extending vertically from a top of said hopper adjacent to said auger to approximately said apex of said conical section;
a second bar connected to a center portion said first bar, said second bar extending horizontally away from said auger toward an interface between said upper portion and said lower portion;
a third bar having opposing ends connected to a first end of said first bar at said apex and to a second end of said second bar at said interface such that said third bar is adjacent to and approximately parallel to an angled sidewall of said conical section of said funnel from said first end of said first bar at said apex to said second end of said second bar at said interface;
a fourth bar connected to said second bar and extending vertically toward said top of said hopper adjacent to a vertical sidewall of said upper portion; and
a plurality of parallel fins,
each fin of said plurality of parallel fins extending vertically between and connected to both said second bar and said third bar, and
each fin of said plurality of parallel fins having a first edge comprising a leading edge and a second edge opposite said leading edge and said leading edge being relatively thin as compared to said second edge such that spaces between adjacent fins of said plurality of parallel fins become increasingly narrow from leading edges of said adjacent fins of said plurality of parallel fins to second edges of said adjacent fins of said plurality of parallel fins,
said rotating of said pair of agitators forcing said powder in a second direction through said spaces, said forcing of said powder in said second direction through said spaces, which become increasingly narrow from said leading edges to said second edges, as said powder also moves in said first direction ensures an essentially uniform powder density within said hopper and minimizes cavitations within said powder at said apex.

8. The system of claim 7, each of the fins of said plurality of parallel fins for each of said agitators positioned at a predetermined angle with respect to a plane extending across a diameter of said hopper such that during rotation of said pair of agitators all fins of said plurality of parallel fins direct said powder towards said auger and cavitations within said powder at said apex of said conical section are minimized.

9. The system of claim 8, said predetermined angle ranging between approximately 45-85 degrees.

10. The system of claim 7, said first edge being parallel to said second edge, said first edge having a first width ranging from 1/8-1/4 inch, said second edge having a second width ranging from 3/4-2 inches.

11. The system of claim 7, further comprising a first motor rotating said auger at a first predetermined speed and a second motor rotating said pair of agitators at a second predetermined speed so that said powder is maintained at a known and essentially uniform density within said hopper without the formation of cavitations adjacent to said auger and further so that said powder is discharged from said outlet at a known and essentially uniform rate, thereby allowing the amount of discharged powder to be determined without a weight scale.

12. The system of claim 11, said first predetermined speed comprising approximately 500-2000 rotations per minute and said second predetermined speed comprising approximately 15-20 rotations per minute.

13. A system for conveying a powder, said system comprising:
a hopper containing said powder and having an upper portion and a lower portion below said upper portion, said lower portion comprising a funnel comprising:
a conical section connected to said upper portion; and
a tubular section connected to an apex of said conical section, said tubular section having an outlet for said powder;
an auger extending vertically through a center of said hopper to said outlet, said auger rotating such that said powder is conveyed through said outlet;
a pair of agitators adjacent opposite sides of said auger, said pair of agitators rotating about said auger in order to mix said powder as said powder moves in a first direction toward said apex and out said outlet and each of said agitators comprising:
a first bar extending vertically from a top of said hopper adjacent to said auger to approximately said apex of said conical section;
a second bar connected to a center portion of said first bar, said second bar extending horizontally away from said auger toward an interface between said upper portion and said lower portion;

a third bar having opposing ends connected to a first end of said first bar at said apex and to a second end of said second bar at said interface such that said third bar is adjacent to and approximately parallel to an angled sidewall of said conical section of said funnel from said first end of said first bar at said apex to said second end of said second bar at said interface; and a plurality of parallel fins,
 each fin of said plurality of parallel fins extending vertically between and connected to both said second bar and said third bar, and
 each fin of said plurality of parallel fins having a first edge comprising a leading edge and a second edge opposite said leading edge and said leading edge being relatively thin as compared to said second edge such that spaces between adjacent fins of said plurality of parallel fins become increasingly narrow from leading edges of said adjacent fins of said plurality of parallel fins to second edges of said adjacent fins of said plurality of parallel fins, said rotating of said pair of agitators forcing said powder in a second direction through spaces between adjacent fins, and said forcing of said powder in said second direction through said spaces, which become increasingly narrow from said leading edges to said trailing edges, as said powder also moves in said first direction ensures an essentially uniform powder density within said hopper and minimizes cavitations within said powder at said apex; and a support ring connected to and supporting said first bar of each of said agitators, said support ring being positioned approximately equidistance between said top of said hopper and said apex and said auger extending through without contacting said support ring.

14. The system of claim 13, each of the fins of said plurality of parallel fins for each of said agitators positioned at a predetermined angle with respect to a plane extending across a diameter of said hopper such that during rotation of said pair of agitators all fins direct said powder towards said auger and cavitations within said powder at said apex of said conical section are minimized.

15. The system of claim 14, said predetermined angle ranging between approximately 45-85 degrees.

16. The system of claim 13, said first edge being parallel to said second edge, said first edge having a first width ranging from ⅛-¼ inch, said second edge having a second width ranging from ¾-2 inches.

17. The system of claim 13, further comprising a first motor rotating said auger at a first predetermined speed and a second motor rotating said pair of agitators at a second predetermined speed so that said powder is maintained at a known and essentially uniform density within said hopper without the formation of cavitations adjacent to said auger and further so that said powder is discharged from said outlet at a known and essentially uniform rate, thereby allowing the amount of discharged powder to be determined without a weight scale.

18. The system of claim 17, said first predetermined speed comprising approximately 500-2000 rotations per minute and said second predetermined speed comprising approximately 15-20 rotations per minute.

19. A system for conveying a powder, said system comprising:
 a hopper containing said powder and having an upper portion and a lower portion below said upper portion, said lower portion comprising a funnel comprising:
  a conical section connected to said upper portion; and
  a tubular section connected to an apex of said conical section, said tubular section having an outlet for said powder;
 an auger extending vertically through a center of said hopper to said outlet, said auger rotating such that said powder is conveyed through said outlet;
 a pair of agitators adjacent opposite sides of said auger, said pair of agitators rotating about said auger in order to mix said powder as said powder moves in a first direction toward said apex and out said outlet and each of said agitators comprising:
  a first bar extending vertically from a top of said hopper adjacent to said auger to approximately said apex of said conical section;
  a second bar connected to a center portion of said first bar, said second bar extending horizontally away from said auger toward said an interface between said upper portion and said lower portion;
  a third bar having opposing ends connected to a first end of said first bar at said apex and to a second end of said second bar at said interface such that said third bar is adjacent to and approximately parallel to an angled sidewall of said conical section of said funnel from said first end of said first bar at said apex to said second end of said second bar at said interface; and
  a plurality of parallel fins pivotably,
   each fin of said plurality of parallel fins extending vertically between and connected to both said second bar and said third bar, and
   each fin of said plurality of parallel fins having a first edge comprising a leading edge and a second edge opposite said leading edge and said leading edge being relatively thin as compared to said second edge such that spaces between adjacent fins of said plurality of parallel fins become increasingly narrow from leading edges of said adjacent fins of said plurality of parallel fins to trailing edges of said adjacent fins of said plurality of parallel fins,
 said rotating of said pair of agitators forcing said powder in a first direction through said spaces,
 said forcing of said powder in said second direction through said spaces, which become increasingly narrow from said leading edges to said second edges, as said powder also moves in said first direction ensures an essentially uniform powder density within said hopper and minimizes cavitations within said powder at said apex, and
 said fins of said plurality of parallel fins being pivotably connected to said second bar and said third bar so as to allow said fins of said plurality of parallel fins to be selectively positioned at a predetermined angle with respect to a plane extending across a diameter of said hopper such that during rotation of said pair of agitators all fins of said plurality of parallel fins direct said powder towards said auger.

20. The system of claim 19, said predetermined angle being selectively adjustable as a function of a rate of discharge of said powder at said outlet.

21. The system of claim 19, said first edge being parallel to said second edge, said first edge having a first width ranging from ⅛-¼ inch, said second edge having a second width ranging from ¾-2 inches.

* * * * *